(12) United States Patent
Yoshida

(10) Patent No.: US 12,045,115 B2
(45) Date of Patent: Jul. 23, 2024

(54) ELECTRONIC APPARATUS CAPABLE OF REDUCING STARTUP TIME PERIOD OF DEVICES, METHOD OF CONTROLLING SAME, AND STORAGE MEDIUM

(71) Applicant: CANON KABUSHIKI KAISHA, Tokyo (JP)

(72) Inventor: Daisuke Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 17/837,169

(22) Filed: Jun. 10, 2022

(65) Prior Publication Data

US 2022/0404897 A1 Dec. 22, 2022

(30) Foreign Application Priority Data

Jun. 17, 2021 (JP) ................................. 2021-100948

(51) Int. Cl.
*G06F 1/32* (2019.01)
*G06F 1/3212* (2019.01)
*G06F 1/3234* (2019.01)
*G06F 1/3296* (2019.01)

(52) U.S. Cl.
CPC .......... *G06F 1/3296* (2013.01); *G06F 1/3212* (2013.01); *G06F 1/3275* (2013.01)

(58) Field of Classification Search
CPC ..... G06F 1/3296; G06F 1/3212; G06F 1/3275
See application file for complete search history.

(56) References Cited

U.S. PATENT DOCUMENTS

2009/0102296 A1* 4/2009 Greene ................. H01Q 1/243
307/149
2022/0352751 A1* 11/2022 Elshafie ................. H02J 50/23

FOREIGN PATENT DOCUMENTS

JP 2013-215976 A 10/2013

* cited by examiner

*Primary Examiner* — Stefan Stoynov
(74) *Attorney, Agent, or Firm* — Cowan, Liebowitz & Latman, P.C.

(57) ABSTRACT

An electronic apparatus is capable of reducing the startup time period of a device requiring initialization while suppressing power consumption of a battery. The electronic apparatus includes a main controller, a sub controller, a battery, a power reception controller configured to extract electric power from radio waves, and a power supply controller configured to control supply of electric power from the battery or the power reception controller to the sub controller. The main controller controls supply of electric power to the power supply controller such that electric power is supplied from the battery in a power-on mode in which power consumption of the electronic apparatus is large, and switches the power supply source to the power reception controller when the electronic apparatus shifts to a power-off mode in which the power consumption is smaller than in the power-on mode.

11 Claims, 7 Drawing Sheets

FIG. 6

| POWER SUPPLY CONTROL MODE | SUPPLIABLE ELECTRIC POWER(Pw) | OUTPUT OF POWER SUPPLY SECTION 201 | SWITCH 206 | SWITCH 207 | SWITCH 208 |
|---|---|---|---|---|---|
| MODE 1 | $Pw \geq 100mW$ | ON | ON | ON | ON |
| MODE 2 | $10mW \leq Pw < 100mW$ | ON | ON | OFF | OFF |
| MODE 3 | $1mW \leq Pw < 10mW$ | OFF | ON | ON | ON |
| MODE 4 | $Pw < 1mW$ | OFF | ON | ON | ON |

ELECTRONIC APPARATUS CAPABLE OF REDUCING STARTUP TIME PERIOD OF DEVICES, METHOD OF CONTROLLING SAME, AND STORAGE MEDIUM

BACKGROUND OF THE INVENTION

Field of the Invention

The present invention relates to an electronic apparatus, a method of controlling the same, and a storage medium.

Description of the Related Art

There is a demand for reducing a startup time period required to start up electronic apparatuses having a photographing function, such as a digital camera and a smartphone, in order to prevent a user from missing a chance of photographing (shutter chance).

In general, when an electronic apparatus is powered on, it is necessary to perform initialization in order to operate a variety of devices of the electronic apparatus, such as a power supply IC and a microcomputer. In the initialization, for example, initial values are written and control programs are loaded from a nonvolatile memory into volatile memories inside the respective devices. The volatile memory can hold information (data) as long as power is supplied thereto, and hence it is possible to reduce the startup time period at the time of power-on of the electronic apparatus, by configuring the electronic apparatus such that electric power continues to be supplied to the volatile memories and the like even in a state in which the electronic apparatus is powered off.

However, in a mobile electronic apparatus, such as a digital camera or a smartphone, a battery is generally used as a power source. For this reason, if electric power continues to be supplied to devices, such as a volatile memory, electric power is consumed even in the power-off state, which reduces the duration time of the battery mounted in the electronic apparatus. Therefore, it is desirable to cut off power supply to devices which are large in power consumption when the electronic apparatus is powered off, but if the power supply is cut off, execution of the initialization of the devices is required whenever the electronic apparatus is powered on, which increases the startup time period. In short, reduction of the startup time period and improvement of power-saving performance are in a trade-off relationship.

To cope with this problem, for example, Japanese Laid-Open Patent Publication (Kokai) No. 2013-215976 discloses a technique for reducing the startup time period by temporarily storing the settings at the time of power-off of an electronic apparatus in a nonvolatile memory and loading the settings temporarily stored in the nonvolatile memory into the volatile memories of target devices at the time of restart (power-on) of the electronic apparatus.

However, in the technique disclosed in Japanese Laid-Open Patent Publication (Kokai) No. 2013-215976, it is necessary to load associated settings temporarily stored in the nonvolatile memory into the volatile memories of the target devices, and hence compared with a case where electric power continues to be supplied to the target devices, the startup time period is increased.

SUMMARY OF THE INVENTION

The present invention provides an electronic apparatus that is capable of reducing the startup time period of a device requiring initialization while suppressing power consumption of a battery.

In a first aspect of the present invention, there is provided an electronic apparatus including a first control unit, a second control unit, a battery, a power reception control unit configured to extract electric power from radio waves, and a power supply control unit configured to control power supply from the battery or the power reception control unit to the second control unit, wherein the first control unit controls power supply to the power supply control unit such that the power supply is performed from the battery when the electronic apparatus is in a first operation mode in which power consumption of the electronic apparatus is large, and is switched to be performed from the power reception control unit when the electronic apparatus shifts to a second operation mode in which the power consumption of the electronic apparatus is smaller than the first operation mode.

In a second aspect of the present invention, there is provided an electronic apparatus including a power source, a processing unit, and a power supply control unit configured to have electric power supplied from the power source and control supply of electric power to the processing unit, wherein the power source includes a battery, and a power reception control unit configured to extract electric power from radio waves, wherein the supply of electric power to the power supply control unit is performed from the battery, in a case where the electronic apparatus is in a first operation mode in which power consumption of the electronic apparatus is large, and is performed from the power reception control unit in a case where the electronic apparatus is in a second operation mode in which the power consumption is smaller than in the first operation mode.

In a third aspect of the present invention, there is provided an electronic apparatus including a power source, a processing unit, and a power supply control unit configured to have electric power supplied from the power source and control supply of electric power to the processing unit, wherein the power source includes a battery, and a power reception control unit configured to extract electric power from radio waves, wherein the power supply control unit has a volatile storage area for storing settings used when the electronic apparatus operates in a first operation mode in which power consumption of the electronic apparatus is large, wherein in a case where the electronic apparatus operates in the first operation mode, power supply to the power supply control unit is performed from the battery, wherein when the electronic apparatus shifts from the first operation mode to a second operation mode in which the power consumption is smaller than in the first operation mode, the settings stored in the volatile storage area are preserved by switching supply of electric power such that electric power is supplied from the power reception control unit to the power supply control unit, and wherein when the electronic apparatus shifts from the second operation mode to the first operation mode again, a startup time period required to start up the power supply control unit is reduced due to preservation of the settings in the volatile storage area.

In a fourth aspect of the present invention, there is provided a method of controlling an electronic apparatus, including supplying, when operating the electronic apparatus in a first operation mode in which power consumption of the electronic apparatus is large, electric power from a battery attached to the electronic apparatus to a power supply control unit configured to control supply of electric power to a control unit that controls an overall operation of the electronic apparatus, and switching, when the electronic apparatus shifts from the first operation mode to a second operation mode in which the power consumption is smaller than in the first operation mode, power supply to the power supply control unit such that the power supply is performed from a power reception control unit configured to extract electric power from radio waves.

According to the present invention, it is possible to reduce the startup time period of a device requiring initialization while suppressing power consumption of the battery.

Further features of the present invention will become apparent from the following description of exemplary embodiments (with reference to the attached drawings).

BRIEF DESCRIPTION OF THE DRAWINGS

FIG. 6 is a diagram useful in explaining power supply control modes in the startup control according to the second embodiment.

DESCRIPTION OF THE EMBODIMENTS

Figure 1:
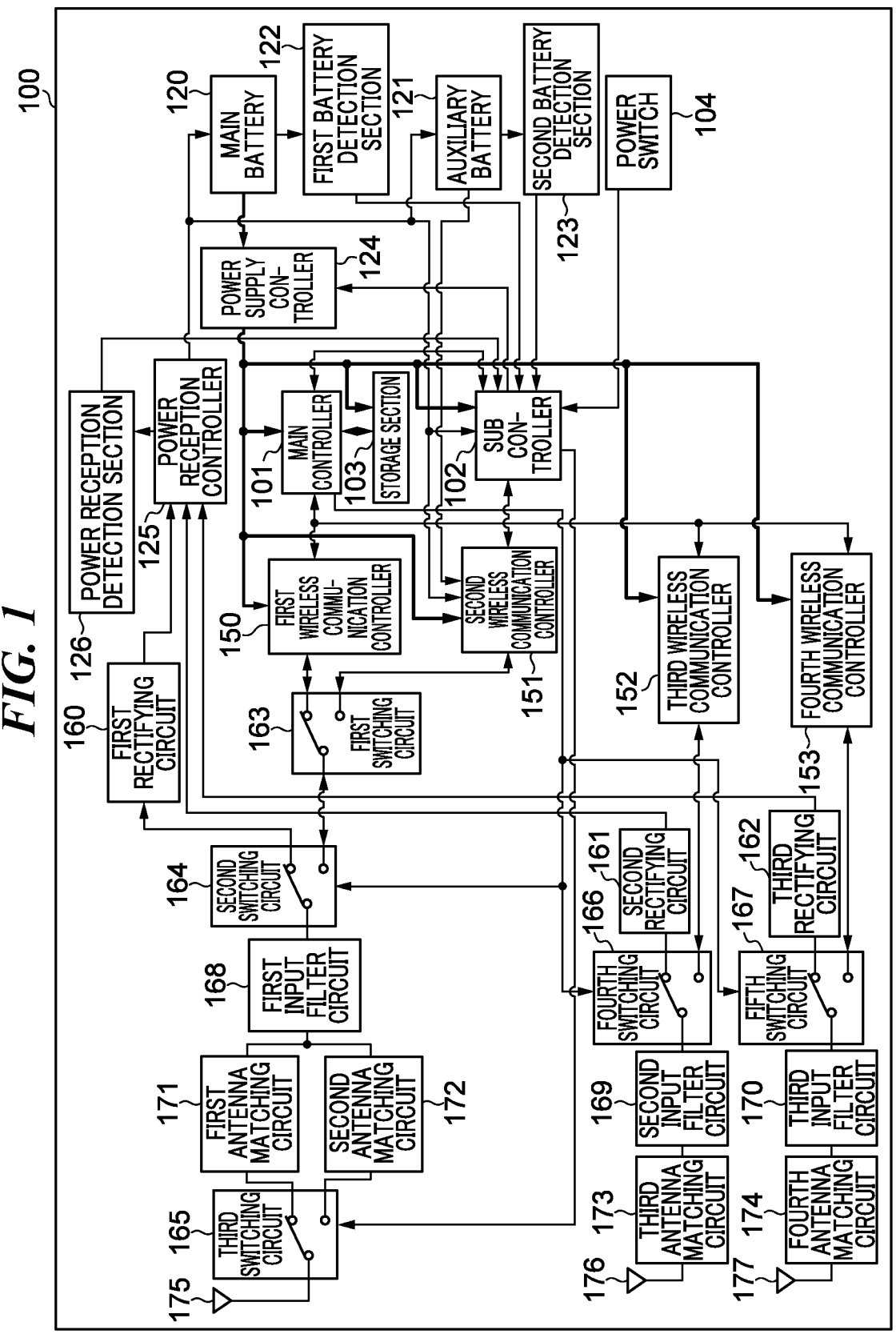
FIG. 1 is a block diagram of an electronic apparatus according to a first embodiment of the invention.

The present invention will now be described in detail below with reference to the accompanying drawings showing embodiments thereof. FIG. 1 is a block diagram of an electronic apparatus 100 according to a first embodiment of the present invention.

The electronic apparatus 100 includes a main controller 101, a sub controller 102, a storage section 103, a power switch 104, a main battery 120, an auxiliary battery 121, a first battery detection section 122, a second battery detection section 123, a power supply controller 124, a power reception controller 125, and a power reception detection section 126. Further, the electronic apparatus 100 includes a first wireless communication controller 150, a second wireless communication controller 151, a third wireless communication controller 152, a fourth wireless communication controller 153, a first rectifying circuit 160, a second rectifying circuit 161, and a third rectifying circuit 162. Furthermore, the electronic apparatus 100 includes a first switching circuit 163, a second switching circuit 164, a third switching circuit 165, a fourth switching circuit 166, a fifth switching circuit 167, a first input filter circuit 168, a second input filter circuit 169, and a third input filter circuit 170. Further, the electronic apparatus 100 includes a first antenna matching circuit 171, a second antenna matching circuit 172, a third antenna matching circuit 173, a fourth antenna matching circuit 174, a first antenna 175, a second antenna 176, and a third antenna 177.

The electronic apparatus 100 is an apparatus that operates using the main battery 120 as a power source in a normal use state, which is typified by a mobile apparatus, such as a digital camera, a smartphone, or a tablet PC.

The main controller 101 is e.g. a microcomputer comprised of a CPU, a ROM, and a RAM, and controls the overall operation of the electronic apparatus 100. The sub controller 102 is e.g. a microcomputer comprised of a CPU, a ROM, and a RAM, and is configured to operate with lower power consumption, compared with the main controller 101, while playing a role of assisting the main controller 101 in the operation control of the electronic apparatus 100. The storage section 103 is configured to be capable of storing and holding a variety of setting information and the like even in a state in which power (electric power) is not supplied, and performing communication with the main controller 101.

The power switch 104 is operated by a user to switch on/off the power supply of the electronic apparatus 100. Switching of on/off of the power switch 104 is detected by the sub controller 102. The main battery 120 is a main power source for operating the electronic apparatus 100, which is implemented, for example, by a secondary battery, such as a rechargeable lithium-ion battery. The auxiliary battery 121 is smaller in battery capacity than the main battery 120, and is e.g. a coin battery which plays a role of assisting the operation of the electronic apparatus 100 in a case where the main battery is absent (such as a case where the main battery 120 is removed). Note that as the auxiliary battery 121, a rechargeable secondary battery is used. The first battery detection section 122 detects whether or not the main battery 120 is attached, and a battery remaining amount or the like of the attached main battery 120. The second battery detection section 123 detects a battery remaining amount and the like of the auxiliary battery 121.

The power supply controller 124 receives electric power supplied from the main battery 120 or the power reception controller 125, and controls the power supply of the electronic apparatus 100 by supplying electric power to the main controller 101, the sub controller 102, the storage section 103, and so forth. Note that the configuration of the power supply controller 124 will be described hereinafter in detail. The power reception controller 125 controls electric power generated by using radio waves, such as microwaves. The power reception detection section 126 detects an amount of electric power or the like received by the power reception controller 125.

The first wireless communication controller 150 controls, for example, wireless communication of a wireless LAN, using radio waves in a 2.4 GHz band. The second wireless communication controller 151 controls, for example, wireless communication of Bluetooth (registered trademark), using radio waves in the 2.4 GHz band. The second wireless communication controller 151 is smaller in power consumption than the first wireless communication controller 150 and can be operated by power fed from the auxiliary battery 121. The third wireless communication controller 152 controls, for example, wireless communication of a wireless LAN that uses radio waves in a 5 GHz band, which are different in frequency band from that of radio waves used by the first wireless communication controller 150. The fourth wireless communication controller 153 controls, for example, wireless communication of a fifth-generation communication system using radio waves in a 28 GHz band, which are different in frequency band from those of the first wireless communication controller 150 and the third wireless communication controller 152.

The first rectifying circuit 160 rectifies communication radio waves in the frequency band used for communication by the first wireless communication controller 150 and the second wireless communication controller 151 and supplies electric power to the power reception controller 125. The second rectifying circuit 161 rectifies communication radio waves in the frequency band used for communication by the third wireless communication controller 152 to supply electric power to the power reception controller 125. The third rectifying circuit 162 rectifies communication radio waves in the frequency band used for communication by the fourth wireless communication controller 153 and supplies electric power to the power reception controller 125.

The first switching circuit 163 switches between the first wireless communication controller 150 and the second wireless communication controller 151, which use the same frequency band. The second switching circuit 164 switches whether to perform wireless communication by the first wireless communication controller 150 or the second wireless communication controller 151, or supply wireless communication radio waves to the power reception controller 125 via the first rectifying circuit 160 as electric power. The third switching circuit 165 switches between the first antenna matching circuit 171 and the second antenna matching circuit 172. The fourth switching circuit 166 switches whether to perform wireless communication by the third wireless communication controller 152 or supply wireless communication radio waves to the power reception controller 125 via the second rectifying circuit 161 as electric power. The fifth switching circuit 167 switches whether to perform wireless communication by the fourth wireless communication controller 153 or supply wireless communication radio waves to the power reception controller 125 via the third rectifying circuit 162 as electric power.

The first input filter circuit 168 passes radio waves in the frequency band used for communication by the first wireless communication controller 150 or the second wireless communication controller 151. The second input filter circuit 169 passes radio waves in the frequency band used for communication by the third wireless communication controller 152. The third input filter circuit 170 passes radio waves in the frequency band used for communication by the fourth wireless communication controller 153.

The first antenna matching circuit 171 causes impedance matching for the first antenna 175 at a use frequency. The second antenna matching circuit 172 causes impedance matching for the first antenna 175 at a use frequency but differs from the first antenna matching circuit 171 in that the impedance matching is caused at a different frequency in the same communication frequency band as that used by the first antenna matching circuit 171. The third antenna matching circuit 173 causes impedance matching for the second antenna 176 at a use frequency. The fourth antenna matching circuit 174 causes impedance matching for the third antenna 177 at a use frequency.

The first antenna 175 receives radio waves in the frequency band used by the first wireless communication controller 150 and the second wireless communication controller 151. The second antenna 176 receives radio waves in the frequency band used by the third wireless communication controller 152. The third antenna 177 receives radio waves in the frequency band used by the fourth wireless communication controller 153.

Figure 2:
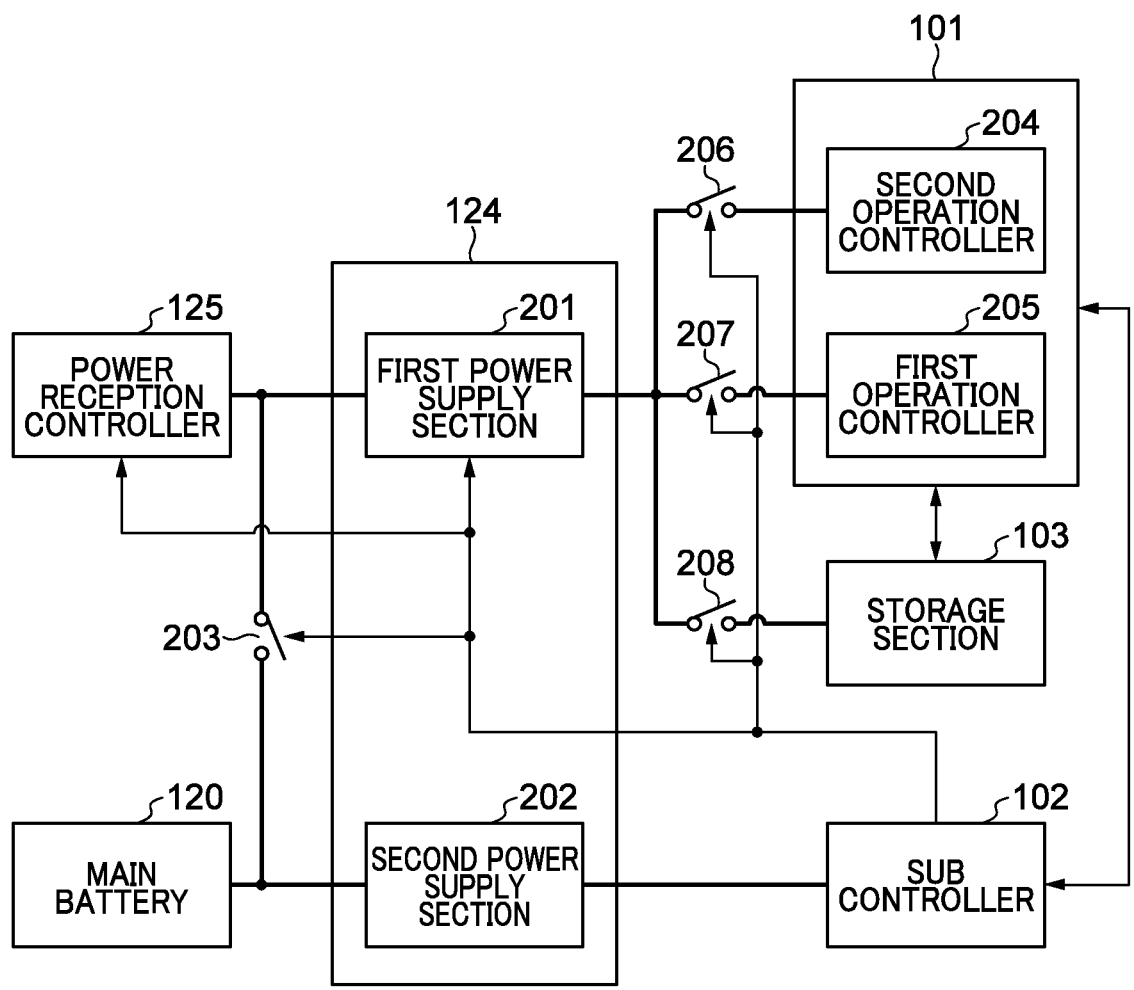
FIG. 2 is a block diagram of a power supply controller and associated components of the electronic apparatus.

Next, the power supply controller 124 and associated components will be described in detail. FIG. 2 is a block diagram of the power supply controller 124 and the associated components.

The power supply controller 124 includes a first power supply section 201 and a second power supply section 202. The first power supply section 201 can receive electric power from both of the main battery 120 and the power reception controller 125, and is implemented e.g. by a DC-DC converter capable of supplying a large amount of electric power. Electric power generated by the first power supply section 201 is supplied to the main controller 101 and the storage section 103. Further, a path for supplying electric power from the main battery 120 to the first power supply section 201 is configured such that an energized state and a shut-off state can be switched by the opening/closing control of a switch 203, which is performed by the sub controller 102. When the switch 203 is opened to cut off power supply, it is possible to stop power supply from the main battery 120 to the first power supply section 201 to thereby reduce power consumption of the main battery 120. The second power supply section 202 can receive electric power from the main battery 120, and is implemented e.g. by a linear regulator. Electric power generated by the second power supply section 202 is supplied to the sub controller 102.

The main controller 101 includes a second operation controller 204 and a first operation controller 205. Electric power for the second operation controller 204, the first operation controller 205, and the storage section 103 is supplied by the first power supply section 201. Further, the power supply to the second operation controller 204, the first operation controller 205, and the storage section 103 can be cut off by the opening/closing control of each of a switch 206, a switch 207, and a switch 208, which is performed by the sub controller 102.

The first operation controller 205 is e.g. a microcomputer that controls the overall operation of the electronic apparatus 100, and has more control resources, compared with the second operation controller 204. The second operation controller 204 is a microcomputer that operates with lower power consumption than the first operation controller 205 and executes processing operations which are not executed by the first operation controller 205 (such as processing for updating the contents of display on a display panel (not shown) of the electronic apparatus 100).

Note that in the electronic apparatus 100, to simplify the explanation, the main controller 101 is formed by the two operation controllers of the first operation controller 205 and the second operation controller 204. However, the main controller 101 can be formed by one, or three or more operation controllers according to the functional configuration.

Figure 3:
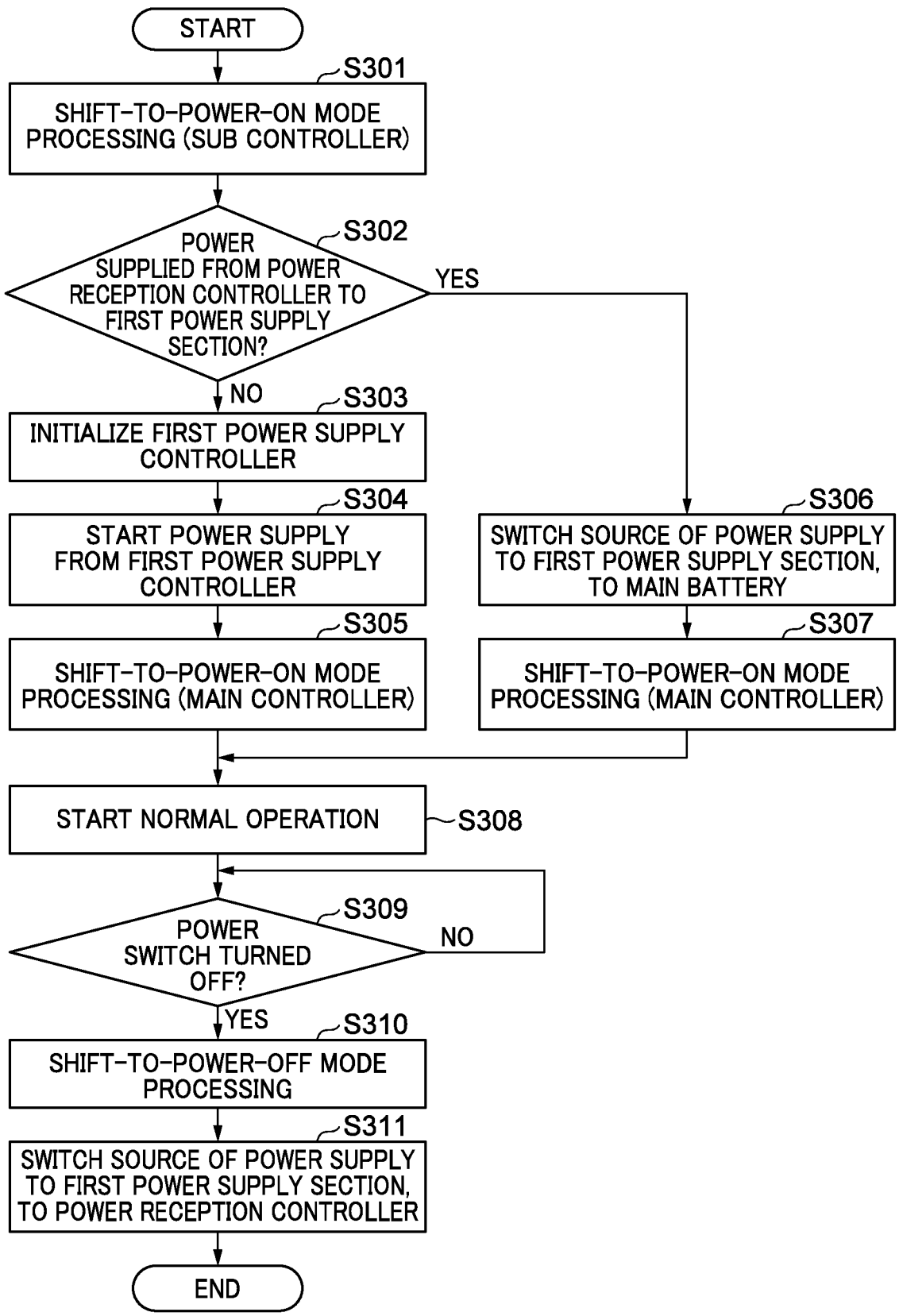
FIG. 3 is a flowchart of a startup control process of the electronic apparatus according to the first embodiment.

Next, a description will be given of the startup control of the electronic apparatus 100 according to the first embodiment, which is performed when the electronic apparatus 100 is started from the power-off state. FIG. 3 is a flowchart of a startup control process of the electronic apparatus 100 according to the first embodiment. Processing operations (steps) each denoted by S number in the flowchart in FIG. 3 are realized by the main controller 101 and the sub controller 102 that execute respective predetermined associated programs to control the operations of the components of the electronic apparatus 100. Note that predetermined ones of the processing operations of the steps in FIG. 3 are executed by respective predetermined associated processors controlled by the main controller 101 and the sub controller 102.

The startup control process in FIG. 3 is started, for example, when a user switches the power switch 104 from off to on. Further, it is assumed that before starting the startup control process (in the off-state of the power switch 104), the switch 203 appearing in FIG. 2 is in the off-state, and the switches 206, 207, and 208 are in the on-state. Note that in a case where the electronic apparatus 100 is not operated in a state in which electric power is supplied from the main battery 120 and the power supply controller 124 to the components (devices), the components as the power supply destinations are each controlled to the off-state by the sub controller 102 so as to save electric power.

When the power switch 104 is switched from off to on, the sub controller 102 performs processing for shifting itself to a power-on mode (first operation mode) in a step S301. In a step S302, the sub controller 102 determines whether or not electric power is being supplied from the power reception controller 125 to the first power supply section 201. The determination in the step S302 is, in other words, processing for checking whether or not it is after execution of processing in a step S311, referred to hereinafter. If it is determined that electric power is not being supplied from the power reception controller 125 to the first power supply section 201 (No to the step S302), the sub controller 102 proceeds to a step S303. Note that when the power switch 104 is turned on for the first time in a state in which the main battery 120 is attached to the electronic apparatus 100, supply of electric power from the main battery 120 is started, and hence the process necessarily proceeds to the step S303. On the other hand, if it is determined that electric power is being supplied from the power reception controller 125 to the first power supply section 201 (Yes to the step S302), the sub controller 102 proceeds to a step S306.

In the step S303, the sub controller 102 supplies electric power from the main battery 120 to the first power supply section 201 and initializes the first power supply section 201. Specifically, the sub controller 102 writes settings (settings of a voltage value, output timing, and so forth) necessary for electric power output from the first power supply section 201, into a volatile register area within the first power supply section 201.

In a step S304, the first power supply section 201 starts supply of electric power to the main controller 101 and the storage section 103 according to the settings set by the sub controller 102. In a step S305, the main controller 101 shifts the whole system of the electronic apparatus 100 to the power-on mode by loading associated programs stored in a nonvolatile storage area of the storage section 103 into a volatile storage area within the main controller 101. With this, when the system of the electronic apparatus 100 is placed in the started state, the main controller 101 proceeds to a step S308.

In the step S306, the sub controller 102 controls the switch 203 to on to thereby switch the source of power supply to the first power supply section 201, from the power reception controller 125 to the main battery 120. This is for the following reason: In the step S302, it is determined that electric power is being supplied from the power reception controller 125 to the first power supply section 201 during the off-state of the power switch 104 of the electronic apparatus 100. This indicates that, during the off-state of the power switch 104, a variety of data stored in the respective volatile storage areas of the first power supply section 201, the main controller 101, and the storage section 103 is maintained by electric power supply from the power reception controller 125.

In a step S307, the main controller 101 shifts the whole system of the electronic apparatus 100 to the power-on mode by sequentially executing the programs loaded in the volatile storage area within the main controller 101. With this, when the system of the electronic apparatus 100 is placed in the started-up state, the main controller 101 proceeds to the step S308.

In the step S308, the main controller 101 performs a normal operation according to an operation performed by the user on the electronic apparatus 100, by sequentially executing the programs loaded in the volatile storage area within the main controller 101. In a step S309, the sub controller 102 determines whether or not the power switch 104 has been switched from on to off. If it is determined that the power switch 104 remains in the on-state (No to the step S309), the sub controller 102 repeats the determination in the step S309 while continuing the normal operation, and if it is determined that the power switch 104 has been switched to off (Yes to the step S309), the sub controller 102 proceeds to a step S310.

In the step S310, the main controller 101 and the sub controller 102 perform processing for shifting the electronic apparatus 100 to a power-off mode (second operation mode). In the step S310, specifically, the processing for shifting the electronic apparatus 100 to a low-power consumption mode is executed e.g. by reducing the speed of an internal clock and stopping the operation of predetermined circuit blocks. In the step S311, the sub controller 102 controls the power reception controller 125 such that electric power is supplied from the power reception controller 125 to the first power supply section 201 and switches off the switch 203 after outputting electric power from the power reception controller 125, followed by terminating the present process. This is to reduce the power consumption of the main battery 120 by preventing electric power from being supplied from the main battery 120 to the first power supply section 201.

Figure 4:
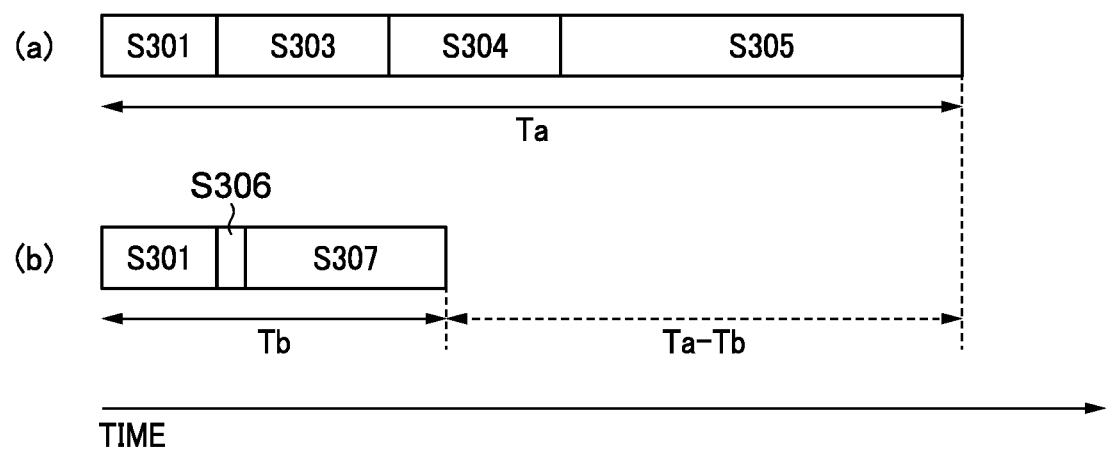
FIG. 4 is a diagram showing a time period required to shift from a power-off mode to a power-on mode in the startup control process in FIG. 3.

Next, the effects obtained by the startup control process in FIG. 3 will be described. In FIG. 4, (a) is a diagram showing a startup time period required to start up the system of the electronic apparatus 100 when in a powered-off state (a startup time period required to shift from the power-off mode to the power-on mode), from a state in which electric power is not supplied to the first power supply section 201. In FIG. 4, (b) is a diagram showing a startup time period required to shift the system of the electronic apparatus 100 when in the powered-off state, from a state in which electric power is supplied from the power reception controller 125 to the first power supply section 201. Note that the S numbers indicated in (a) and (b) of FIG. 4 correspond to the S numbers in the flowchart in FIG. 3. For example, S301 in (a) and (b) in FIG. 4 indicates a time period required to perform the processing in the step S301 of the startup control process in FIG. 3.

A time period Ta is required to complete the startup of the system of the electronic apparatus 100 in the case of (a) of FIG. 4, but in the case of (b) in FIG. 4, the startup is completed within a time period Tb shorter than the time period Ta. That is, by performing processing in the steps S306 and S307 of the startup control process in FIG. 3, it is possible to reduce the startup time period by "Ta−Tb", compared with a case of performing processing in the steps S303 to S305 of the the startup control process.

In the present embodiment, electric power is supplied from the power reception controller 125 to the main controller 101 and the storage section 103 via the first power supply section 201 using the technique of converting microwaves of a wireless LAN, mobile phone communication, or the like to electric power, which is one of the techniques of energy harvesting. With this, it is possible to suppress the power consumption of the main battery 120, and further, it is possible to reduce the size of the electronic apparatus 100 in accordance with reduction of the capacity of the main battery 120, and furthermore, it is possible to reduce the startup time period, compared with the conventional method of starting up an electronic apparatus.

Note that in the configuration in which the settings are temporarily stored in the nonvolatile memory in order to maintain the settings when electric power is cut off, as in the technique described in Japanese Laid-Open Patent Publication (Kokai) No. 2013-215976, the nonvolatile memory for temporary storage is required to have a storage capacity large enough to store an amount of data to be stored therein. In this case, if the amount of data is large, there is a possibility of an increase in the costs required to implement the nonvolatile memory for temporary storage, but in the present embodiment, the nonvolatile memory for temporary storage is not required, and hence it is possible to avoid the increase in costs.

Next, a description will be given of the startup control performed when the electronic apparatus 100 according to a second embodiment of the invention is started up from the power-off state. In the first embodiment, the description is given of the configuration in which the time period required to start up the system of the electronic apparatus 100 is reduced by using electric power output from the power reception controller 125 for driving the power supply controller 124. Further, in the first embodiment, the system startup time period is reduced by supplying electric power to the power supply controller 124 without depending on the state of supply of electric power from the power reception controller 125.

Here, when converting radio waves to electric power, depending on the state of radio waves, there are a case where sufficient electric power cannot be extracted and a case where extractable electric power changes. Therefore, if the system startup time period of the electronic apparatus 100 is reduced, as described in the first embodiment, in a state in which power supply to the power supply controller 124, the main controller 101, and the storage section 103 is insufficient, there is a fear that the settings written in the volatile storage area of each device are lost. In this case, there is a possibility that the electronic apparatus 100 cannot be normally started up.

In the second embodiment, the description will be given of a configuration which makes it possible to solve even such a problem. Note that the block configuration of the electronic apparatus 100 conforms to FIGS. 1 and 2 and the description given with reference thereto, and hence the description of the block configuration is omitted. Further, in the second embodiment, a startup control process described hereafter with reference to FIG. 5 is performed in place of the startup control process in FIG. 3 in the first embodiment.

Figure 5:
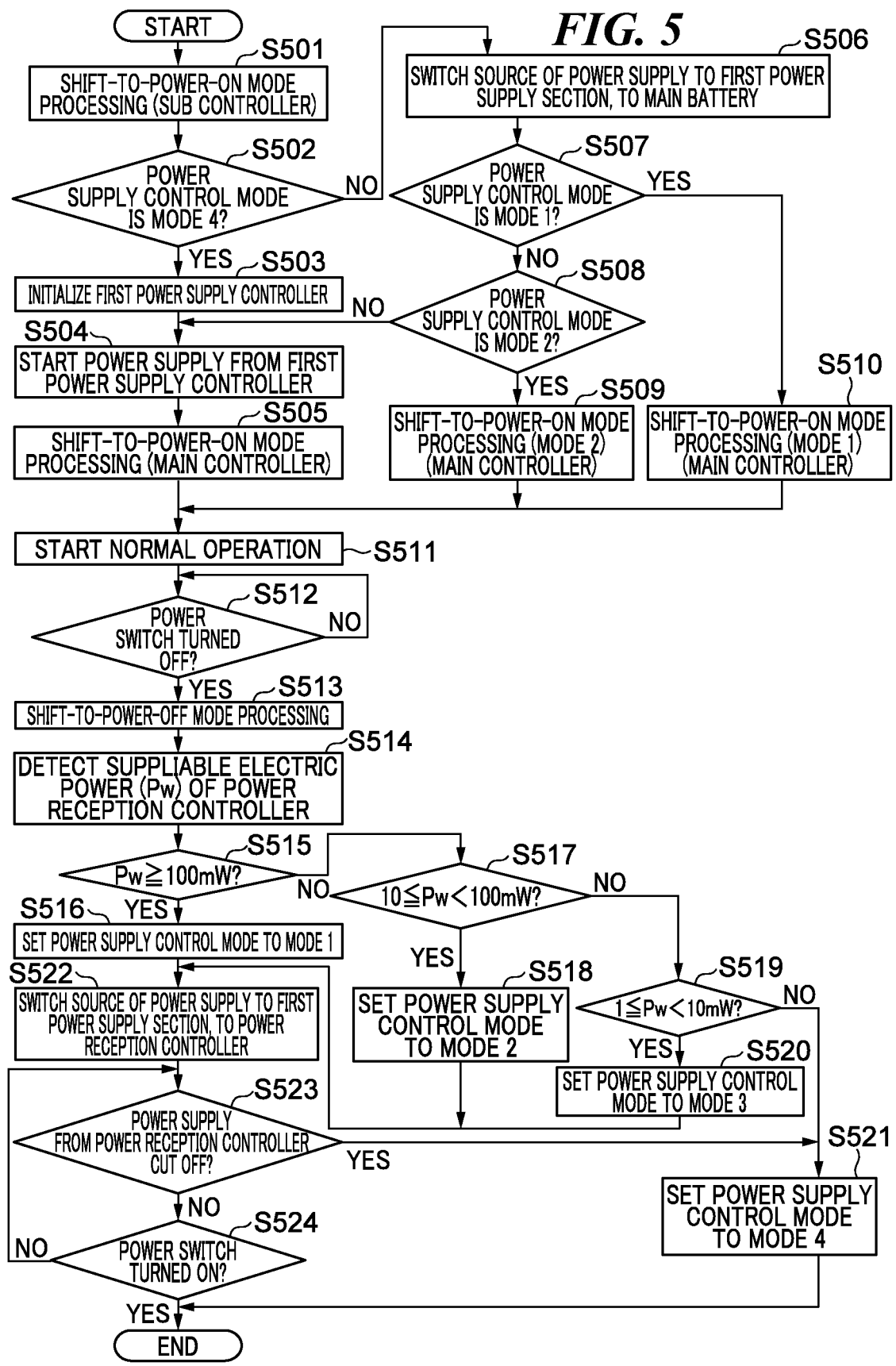
FIG. 5 is a flowchart of a startup control process of an electronic apparatus according to a second embodiment of the invention.

FIG. 5 is a flowchart of the startup control process according to the second embodiment of the electronic apparatus 100. The startup control process in FIG. 5 is started when a user switches the power switch 104 from off to on, for example. Further, processing operations (steps) each denoted by S number in the flowchart in FIG. 5 are realized by the main controller 101 and the sub controller 102 that execute respective predetermined associated programs to control the operations of the components of the electronic apparatus 100. However, predetermined ones of the processing operations in the steps of the startup control process in FIG. 5 are executed by respective predetermined associated processors controlled by the main controller 101 and the sub controller 102.

A step S501 is the same as the step S301 of the startup control process in FIG. 3, and hence description thereof is omitted. In a step S502, the sub controller 102 determines whether or not a power supply control mode, described hereinafter, is mode 4, referred to hereinafter. Note that it is assumed that when the electronic apparatus 100 is started up for the first time after the main battery 120 is attached to the electronic apparatus 100 in the power-off state, the power supply control mode is necessarily set to mode 4. If it is determined that the power supply control mode is mode 4 (Yes to the step S502), the sub controller 102 proceeds to a step S503, whereas if it is determined that the power supply control mode is not mode 4 (No to the step S502), the sub controller 102 proceeds to a step S506.

The step S503 and steps S504 and S505 are the same as the steps S303 to S305 of the start up control process in FIG. 3, and hence description thereof is omitted. The step S506 is the same as the step S306 of the startup control process in FIG. 3, and hence description thereof is omitted. In a step S507, the sub controller 102 determines whether or not the power supply control mode is mode 1, referred to hereinafter. If it is determined that the power supply control mode is mode 1 (Yes to the step S507), the sub controller 102 proceeds to a step S510, whereas if it is determined that the power supply control mode is not mode 1 (No to the step S507), the sub controller 102 proceeds to a step S508.

In the step S508, the sub controller 102 determines whether or not the power supply control mode is mode 2, referred to hereinafter. If it is determined that the power supply control mode is mode 2 (Yes to the step S508), the sub controller 102 proceeds to a step S509. On the other hand, if the power supply control mode is not mode 2, this means that the power supply control mode has been set to mode 3, referred to hereinafter, and, in mode 3, electric power is supplied from the power reception controller 125 to the first power supply section 201, and hence the initialization performed in the step S503 is effective. Therefore, if it is determined that the power supply control mode is not mode 2 (No to the step S508), the sub controller 102 proceeds to the step S504.

If the power supply control mode has been set to mode 2, electric power is supplied from the power reception controller 125 to the first power supply section 201, and also supplied from the first power supply section 201 to the second operation controller 204. Therefore, in the step S509, the main controller 101 shifts the system of the electronic apparatus 100 to the power-on mode. Specifically, in the step S509, the sub controller 102 performs the initialization of the main controller 101 while omitting the initialization of the first power supply section 201, and the main controller 101 which has been initialized performs the initialization of the first operation controller 205 while omitting the initialization of the second operation controller 204. Then, the first operation controller 205 loads predetermined associated programs stored in the nonvolatile memory of the storage section 103 into a volatile storage area of the first operation controller 205 and sequentially executes the loaded programs. Thus, after the system of the electronic apparatus 100 has been started up, the main controller 101 proceeds to a step S511.

If it is determined in the step S507 that the power supply control mode is mode 1, the predetermined associated programs have already been loaded in the volatile storage area of the main controller 101. Therefore, in the step S510, the main controller 101 starts up the system of the electronic apparatus 100 by sequentially executing the programs already loaded in the volatile storage area of its own. Thus, after the system of the electronic apparatus 100 has been started up, the main controller 101 proceeds to the step S511.

The steps S511 and steps S512 and S513 are the same as the steps S308 to S310 of the startup control process in FIG. 3, and hence description thereof is omitted. In a step S514, the power reception detection section 126 detects suppliable electric power of the power reception controller 125 and notifies the sub controller 102 of the result of the detection. In a step S515 and subsequent steps, the sub controller 102 determines the power supply control mode according to the suppliable electric power of the power reception controller 125, which has been notified from the power reception detection section 126. Then, the sub controller 102 controls the first power supply section 201 and on (closing)/off (opening) of the switches 206 to 208 according to the determined power supply control mode.

FIG. 6 is a diagram useful in explaining the power supply control mode which can be set by the electronic apparatus 100. The power supply control mode is determined based on the suppliable electric power (Pw) of the power reception controller 125, the output state of the first power supply section 201, and the on/off states of the switches 206 to 208. In the present embodiment, the power supply control mode is determined such that the operational electric power of the connection destination devices in the power-off mode does not exceed the suppliable electric power of the power reception controller 125.

The step S515 and the subsequent steps will be described with reference to FIG. 6. In the following description, 100 mW, 10 mW, and 1 mW are set as a first threshold value, a second threshold value, and a third threshold value, respectively, for the suppliable electric power Pw of the power reception controller 125, for convenience of explanation. However, the first to third threshold values are not limited to these, and suitable values are determined in accordance with electric power required to hold the information in the volatile storage areas of the main controller 101, the power supply controller 124, and the storage section 103.

In the step S515, the sub controller 102 determines whether or not the suppliable electric power Pw of the power reception controller 125, which has been notified from the power reception detection section 126, is not smaller than the first threshold value (Pw≥100 mW). If it is determined that Pw≥100 mW holds (Yes to the step S515), the sub controller 102 proceeds to a step S516, whereas if it is determined that Pw<100 mW holds (No to the step S515), the sub controller 102 proceeds to a step S517.

In the step S516, the sub controller 102 sets the power supply control mode to mode 1 in which electric power can be supplied to all of the first power supply section 201, the second operation controller 204, the first operation controller 205, and the storage section 103 during the power-off mode, and then proceeds to a step S522.

In the step S517, the sub controller 102 determines whether or not the suppliable electric power Pw of the power reception controller 125 is not smaller than the second threshold value and smaller than the first threshold value (10 mW≤Pw<100 mW). If it is determined that 10 mW≤Pw<100 mW holds (Yes to the step S517), the sub controller 102 proceeds to a step S518, whereas if it is determined that Pw<10 mW holds (No to the step S517), the sub controller 102 proceeds to a step S519.

In the step S518, the sub controller 102 sets the power supply control mode to mode 2 in which electric power can be supplied to two blocks, i.e. the first power supply section 201 and the second operation controller 204 that is smaller in operational electric power during the power-off mode than the first operation controller 205 and the storage section 103, and then proceeds to the step S522. Note that power supply to the first operation controller 205 and the storage section 103 is stopped by switching off the switches 207 and 208.

In the step S519, the sub controller 102 determines whether or not the suppliable electric power Pw of the power reception controller 125 is not smaller than the third threshold value and smaller than the second threshold value (1 mW≤Pw<10 mW). If it is determined that 1 mW≤Pw<10 mW holds (Yes to the step S519), the sub controller 102 proceeds to a step S520, whereas if it is determined that Pw<1 mW holds (No to the step S519), the sub controller 102 proceeds to a step S521.

In the step S520, the sub controller 102 sets the power supply control mode to mode 3 in which electric power can be supplied only to the first power supply section 201 and then proceeds to the step S522. Note that power supply to the first operation controller 205, the second operation controller 204, and the storage section 103 is stopped by switching off the switches 206 to 208.

In a case where the process proceeds to the step S521, the suppliable electric power Pw of the power reception controller 125, which has been notified from the power reception detection section 126, is smaller than the third threshold value (Pw<1 mW), and the sub controller 102 determines that electric power cannot be supplied from the power reception controller 125 to the first power supply section 201. Therefore, in the step S521, the sub controller 102 sets the power supply control mode to mode 4 in which power supply from the power reception controller 125 is not performed in the power-off mode, followed by terminating the present process.

The step S522 is the same as the step S311 of the startup control process in FIG. 3, and hence description thereof is omitted. In a step S523, the sub controller 102 determines whether or not the power reception detection section 126 has detected that power supply from the power reception controller 125 has been cut off. Specifically, the power reception detection section 126 monitors the output voltage from the power reception controller 125, and in a case where it is detected that the output voltage has become equal to or lower than a predetermined voltage Vlimit (e.g. 2V), the power reception detection section 126 determines that power supply from the power reception controller 125 has been cut off. If it is determined that power supply from the power reception controller 125 has been cut off (Yes to the step S523), the sub controller 102 proceeds to the step S521, whereas if it is determined that power supply from the power reception controller 125 has not been cut off (No to the step S523), the sub controller 102 proceeds to a step S524.

In the step S524, the sub controller 102 determines whether or not the power switch 104 has been operated from off to on. If it is determined that the power switch 104 has been operated from off to on (Yes to the step S524), the sub controller 102 terminates the present process. With this, the process is started from the step S501 again. On the other hand, if it is determined that the power switch 104 has not been operated from off to on (No to the step S524), the sub controller 102 returns to the step S523.

Figure 7:
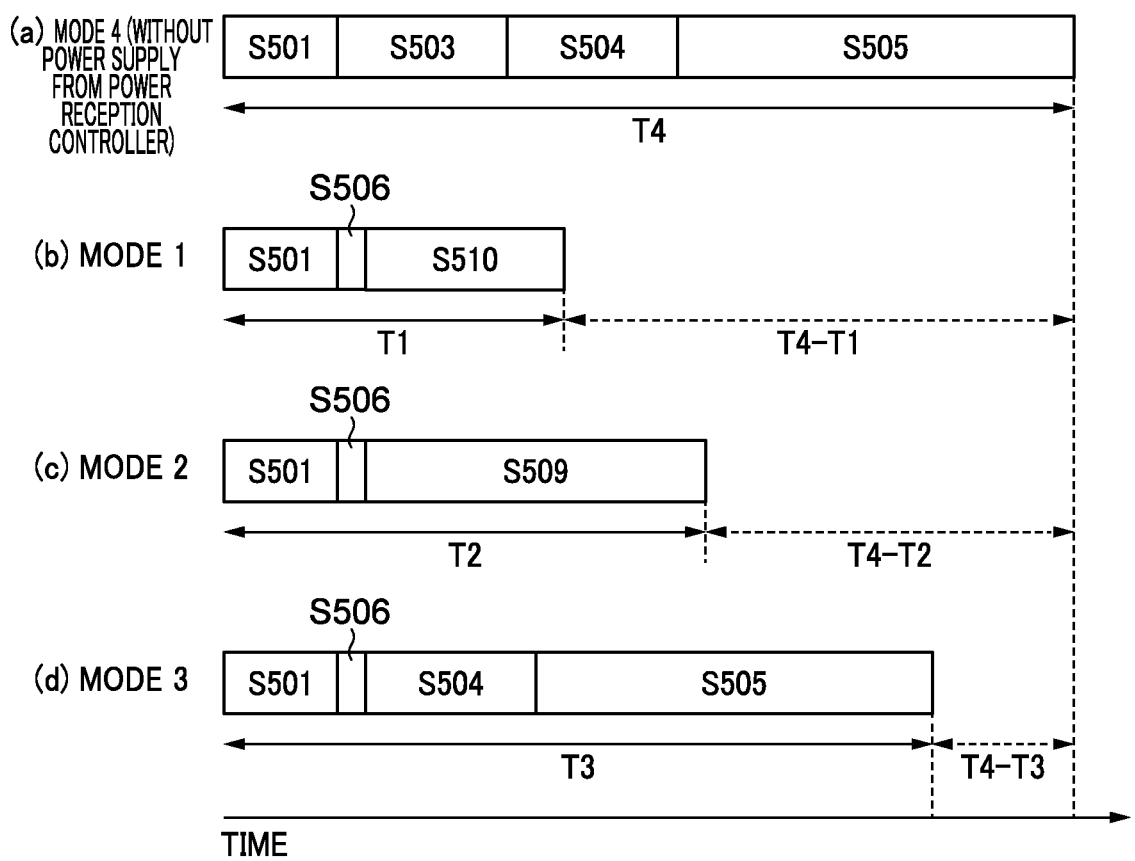
FIG. 7 is a diagram showing a time period required to shift from the power-off mode to the power-on mode in the startup control in FIG. 5.

Next, the effects obtained by the startup control process in FIG. 5 will be described. In FIG. 7, (a), (b), (c), and (d) are diagrams each showing a time period required to start up the electronic apparatus 100 from respective states in which the power supply control mode at the power-off time of the electronic apparatus 100 is set to mode 4, mode 1, mode 2, and mode 3, respectively. Note that the S numbers indicated in FIG. 7 correspond to the S numbers of the flowchart in FIG. 5.

In the power supply control according to the second embodiment, when electric power is supplied from the power reception controller 125 to the first power supply section 201, the power supply control mode is switched according to the power supply capability of the power reception controller 125. With this, it is possible to reduce the startup time period required to start up the system of the electronic apparatus 100 from the power-off mode while suppressing the power consumption of the main battery 120.

The effect of reduction of the startup time period is larger as the number of devices to which electric power is supplied from the power reception controller 125 even in the power-off mode is larger, and there holds a relationship of startup time period T1 in mode 1<startup time period T2 in mode 2<startup time period T3 in mode 3<startup time period T4 in mode 4 holds. Note that the startup time period T4 in mode 4 is equal to the time period Ta in (a) of FIG. 4.

Further, in the power supply control according to the second embodiment, the power supply control mode is set within a range not exceeding the power supply capability of the power reception controller 125. This makes it possible to prevent occurrence of a situation where power supply from the power reception controller 125 is unintentionally cut off in a state in which the power switch 104 is off. As a result, it is possible to avoid occurrence of a trouble that the electronic apparatus 100 is not normally started up when the power switch 104 is turned on next time. Further, in a case where it is detected by the power reception detection section 126 that power supply from the power reception controller 125 is cut off in the state in which the power switch 104 is off, the power supply control mode is set to mode 4. With this, it is possible to avoid occurrence of a trouble that the electronic apparatus 100 is not normally started up when the power switch 104 is turned on next time.

The present invention has been described heretofore based on the embodiments thereof. However, the present invention is not limited to these embodiments, but it is to be understood that the invention includes a variety of forms within the scope of the gist of the present invention. Further, the embodiments of the present invention are described only by way of example, and it is possible to combine the embodiments on an as-needed basis.

For example, there is known an electronic apparatus that shifts from a normal operation mode to a power-saving mode (low-power consumption mode) in a case where the non-operation time continues. The power supply control mode-setting method described in the above-described embodiments can be applied to this process for shifting the electronic apparatus from the normal operation mode to the power-saving mode.

Further, in the above-described embodiments, the switch 203 is provided between the main battery 120 and the first power supply section 201, and the power consumption of the main battery 120 is reduced by switching off the switch 203 as long as electric power is supplied from the power reception controller 125 to the first power supply section 201. This is not limitative, but, for example, in a case where the power consumption of the first power supply section 201 is sufficiently small when the output from the first power supply section 201 is cut off, there may be employed a configuration in which the switch 203 is not provided. Further, there may be employed a configuration in which power supply from the power reception controller 125 is enabled in a case where electric power is supplied from both of the main battery 120 and the power reception controller 125 to the first power supply section 201.

Although in the above-described embodiments, the switches 206 to 208 are provided in order to intentionally cut off power supply from the first power supply section 201, this is not limitative, but there may be employed a configuration in which output of electric power from the first power supply section 201 is stopped.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-100948, filed Jun. 17, 2021, which is hereby incorporated by reference herein in its entirety.

What is claimed is:

1. An electronic apparatus comprising:
a first control unit;
a second control unit;
a battery;
a power reception control unit configured to extract electric power from radio waves; and
a power supply control unit configured to control power supply from the battery or the power reception control unit to the second control unit,
wherein the first control unit controls power supply to the power supply control unit such that the power supply is performed from the battery when the electronic apparatus is in a first operation mode in which power consumption of the electronic apparatus is large, and is switched to be performed from the power reception control unit when the electronic apparatus shifts to a second operation mode in which the power consumption of the electronic apparatus is smaller than the first operation mode.

2. The electronic apparatus according to claim 1, wherein the power supply control unit and the second control unit each have a volatile storage area for storing settings used when the electronic apparatus operates in the first operation mode, and
wherein in the second operation mode, at least the settings stored in the volatile storage area of the power supply control unit are preserved.

3. The electronic apparatus according to claim 1, further comprising:
a storage unit, and a detection unit configured to detect electric power supplied from the power reception control unit to the power supply control unit, and wherein the power supply control unit further controls power supply from the battery or the power reception control unit to the storage unit, and wherein when the electronic apparatus shifts from the first operation mode to the second operation mode, the first control unit determines a destination of power supply from the power supply control unit, according to electric power detected by the detection unit.

4. The electronic apparatus according to claim 3, wherein the power supply control unit, the second control unit, and the storage unit each have a volatile storage area for storing settings used when the electronic apparatus operates in the first operation mode, and wherein in a case where it is detected by the detection unit that electric power not smaller than a first threshold value is supplied from the power reception control unit to the power supply control unit, the first control unit employs a first power supply control mode in which power supply to the power supply control unit, the second control unit, and the storage unit is performed, and wherein in the second operation mode, the settings stored in respective volatile storage areas of the power supply control unit, the second control unit, and the storage unit are preserved.

5. The electronic apparatus according to claim 4, wherein by reading the settings stored in the respective volatile storage areas of the power supply control unit, the second control unit, and the storage unit, a startup time period required when switching from the second operation mode to the first operation mode is made shorter than a startup time period required to start up the electronic apparatus from a state in which the power supply to the power supply control unit, the second control unit, and the storage unit is not performed.

6. The electronic apparatus according to claim 4, wherein in a case where it is detected by the detection unit that electric power smaller than the first threshold value and is not smaller than a second threshold value which is smaller than the first threshold value is supplied from the power reception control unit to the power supply control unit, the first control unit employs a second power supply control mode in which power supply to the power supply control unit and the second control unit is performed, and wherein in the second operation mode, settings stored in the respective volatile storage areas of the power supply control unit and the second control unit are preserved.

7. The electronic apparatus according to claim 6, wherein by reading the settings stored in the respective volatile storage areas of the power supply control unit and the second control unit, a startup time period required when switching from the second operation mode to the first operation mode is made shorter than a startup time period required to start up the electronic apparatus from a state in which power supply to the power supply control unit, the second control unit, and the storage unit is not performed.

8. The electronic apparatus according to claim 7, wherein in a case where it is detected by the detection unit that electric power smaller than the second threshold value and is not smaller than a third threshold value which is smaller than the second threshold value is supplied from the power reception control unit to the power supply control unit, the first control unit employs a third power supply control mode in which the power supply to the power supply control unit is performed, and wherein in the second operation mode, the settings stored in the volatile storage area of the power supply control unit is preserved.

9. The electronic apparatus according to claim 7, wherein by reading the settings stored in the volatile storage area of the power supply control unit, the startup time period required when switching from the second operation mode to the first operation mode is made shorter than the startup time period required to start up the electronic apparatus from a state in which the power supply to the power supply control unit, the second control unit, and the storage unit is not performed.

10. The electronic apparatus according to claim 8, wherein in a case where it is detected by the detection unit that electric power smaller than the third threshold value is supplied from the power reception control unit to the power supply control unit, the first control unit employs a fourth power supply control mode in which the power supply to the power supply control unit is stopped.

11. The electronic apparatus according to claim 1, wherein the second operation mode is executed in a state in which a power switch of the electronic apparatus is off, and wherein the first operation mode is executed in a state in which the power switch is on.

* * * * *